US012043029B2

(12) United States Patent
Aimono et al.

(10) Patent No.: US 12,043,029 B2
(45) Date of Patent: Jul. 23, 2024

(54) LIQUID EJECTING HEAD, LIQUID EJECTING APPARATUS, AND LIQUID EJECTING METHOD

(71) Applicant: SEIKO EPSON CORPORATION, Tokyo (JP)

(72) Inventors: Takanori Aimono, Matsumoto (JP); Eiju Hirai, Azumino (JP); Akinori Taniuchi, Matsumoto (JP); Shotaro Tamai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 17/646,007

(22) Filed: Dec. 27, 2021

(65) Prior Publication Data

US 2022/0203676 A1 Jun. 30, 2022

(30) Foreign Application Priority Data

Dec. 28, 2020 (JP) ................................ 2020-218871

(51) Int. Cl.
*B41J 29/38* (2006.01)
*B41J 2/045* (2006.01)

(52) U.S. Cl.
CPC ......... *B41J 2/04541* (2013.01); *B41J 2/0458* (2013.01)

(58) Field of Classification Search
CPC ......... B41J 2/195; B41J 2/211; B41J 2/04541
See application file for complete search history.

(56) References Cited

U.S. PATENT DOCUMENTS

| | | | | |
|---|---|---|---|---|
| 6,102,507 A * | 8/2000 | Yoshida | B41J 2/195 347/6 |
| 6,341,832 B1 * | 1/2002 | Narushima | B41J 2/211 347/14 |
| 2011/0181674 A1 * | 7/2011 | Kang | B41J 2/211 347/94 |
| 2020/0207996 A1 * | 7/2020 | Yatake | C09D 11/322 |

FOREIGN PATENT DOCUMENTS

JP 2006-341408 A 12/2006

* cited by examiner

*Primary Examiner* — Lam S Nguyen
(74) *Attorney, Agent, or Firm* — WORKMAN NYDEGGER

(57) ABSTRACT

A liquid ejecting head includes: a first pressure chamber to which a first liquid is supplied; a first drive element that applies pressure to the first liquid in the first pressure chamber; a second pressure chamber to which a second liquid is supplied; a second drive element that applies pressure to the second liquid in the second pressure chamber; a nozzle channel which has one end communicating with the first pressure chamber and another end communicating with the second pressure chamber and in which the first liquid supplied from the first pressure chamber and the second liquid supplied from the second pressure chamber are mixed; and a nozzle that is provided in the nozzle channel and ejects a mixture of the first liquid and the second liquid.

8 Claims, 6 Drawing Sheets

LIQUID EJECTING HEAD, LIQUID EJECTING APPARATUS, AND LIQUID EJECTING METHOD

The present application is based on, and claims priority from JP Application Serial Number 2020-218871, filed Dec. 28, 2020, the disclosure of which is hereby incorporated by reference herein in its entirety.

BACKGROUND

1. Technical Field

The present disclosure relates to a liquid ejecting head, a liquid ejecting apparatus, and a liquid ejecting method.

2. Related Art

Ink jet recording methods for forming an image by mixing, on a recording target medium, a liquid composition containing a metal colloid and a reaction liquid containing an aggregating agent for aggregating the metal colloid in the liquid composition have been known (for example, JP-A-2006-341408).

When a plurality of liquids are mixed on a recording target medium, it is difficult for the plurality of liquids to be sufficiently stirred, and liquid performance may be lowered. Thus, a technique of appropriately mixing a plurality of liquids has been desired.

SUMMARY

According to a first aspect of the disclosure, a liquid ejecting head is provided. The liquid ejecting head includes: a first pressure chamber to which a first liquid is supplied; a first drive element that applies pressure to the first liquid in the first pressure chamber; a second pressure chamber to which a second liquid is supplied; a second drive element that applies pressure to the second liquid in the second pressure chamber; a nozzle channel which has one end communicating with the first pressure chamber and another end communicating with the second pressure chamber and in which the first liquid supplied from the first pressure chamber and the second liquid supplied from the second pressure chamber are mixed; and a nozzle that is provided in the nozzle channel and ejects a mixture of the first liquid and the second liquid.

According to a second aspect of the disclosure, a liquid ejecting apparatus is provided. The liquid ejecting apparatus includes: the liquid ejecting head according to the first aspect; and a control device configured to control operation of the liquid ejecting head.

According to a third aspect of the disclosure, a liquid ejecting method is provided. The liquid ejecting method includes: preparing a first drive element that applies pressure to a first liquid and a second drive element that applies pressure to a second liquid; supplying the first liquid and the second liquid to a nozzle channel including a nozzle; causing, when a ratio of the first liquid is larger than a ratio of the second liquid in a mixing ratio of the first liquid and the second liquid in liquid droplets ejected from the nozzle, a drive voltage larger than a drive voltage applied to the second drive element to be applied to the first drive element and causing a mixture of the first liquid and the second liquid to be ejected from the nozzle; and causing, when the ratio of the second liquid is larger than the ratio of the first liquid in the mixing ratio, a drive voltage larger than a drive voltage applied to the first drive element to be applied to the second drive element and causing a mixture of the first liquid and the second liquid to be ejected from the nozzle.

DESCRIPTION OF EXEMPLARY EMBODIMENTS

A. First Embodiment

Figure 1:
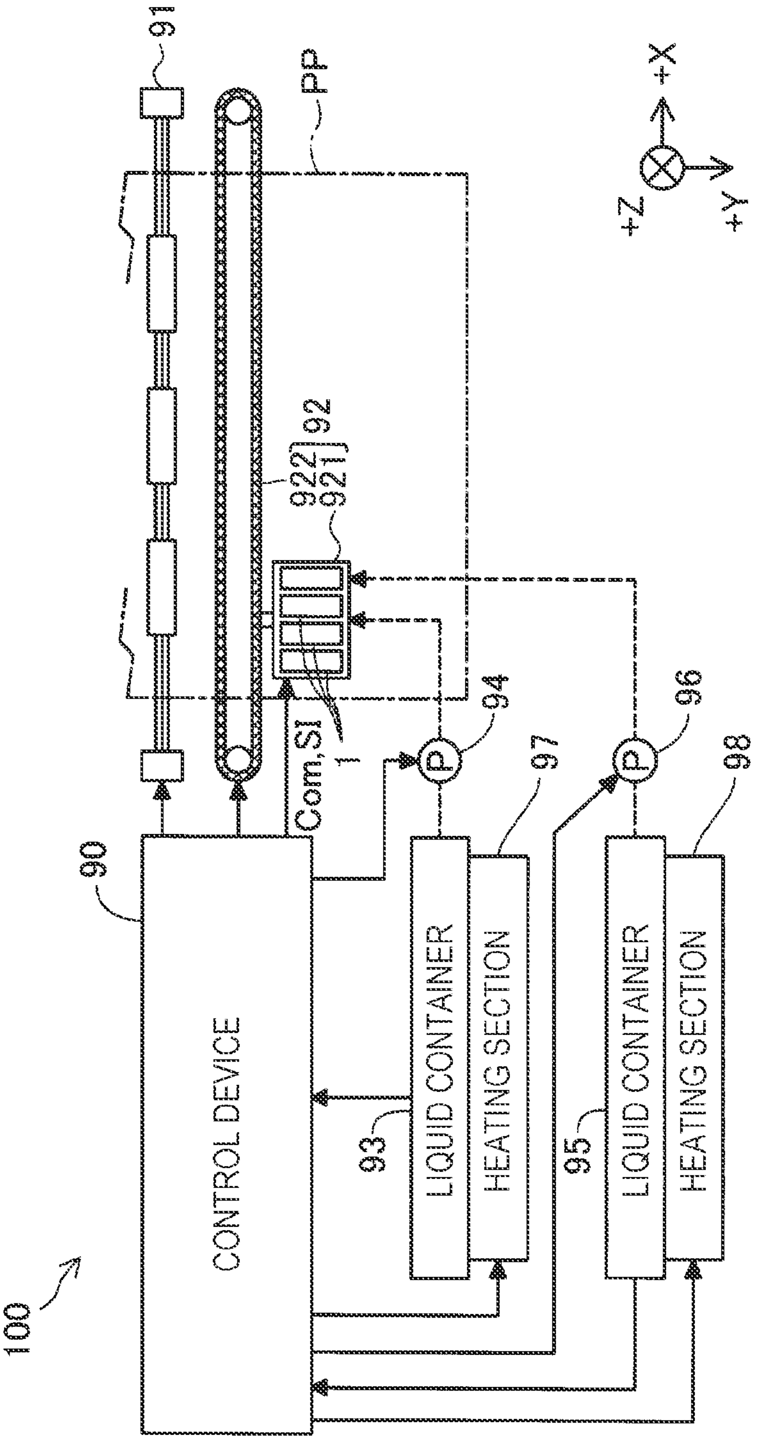
FIG. 1 is a view for explaining a liquid ejecting apparatus according to a first embodiment.

FIG. 1 is a view for explaining a liquid ejecting apparatus 100 according to a first embodiment. The liquid ejecting apparatus 100 of the first embodiment is, for example, an ink jet printing apparatus that ejects ink onto a medium PP such as a printing sheet. In addition to a printing sheet, any printing object made from resin film, fabric, or the like may be used as the medium PP. FIG. 1 indicates the X-axis direction, the Y-axis direction, and the Z-axis direction. The X-axis direction includes the +X direction and the −X direction, which is opposite to the +X direction. The Y-axis direction includes the +Y direction and the −Y direction, which is opposite to the +Y direction. The Z-axis direction includes the +Z direction and the −Z direction, which is opposite to the +Z direction. The X-axis direction, the Y-axis direction, and the Z-axis direction are orthogonal to each other. The X-axis direction, the Y-axis direction, and the Z-axis direction indicated in FIG. 1 are also common to drawings subsequent to FIG. 1.

As illustrated in FIG. 1, the liquid ejecting apparatus 100 includes a liquid ejecting head 1 that ejects liquid, one or more control devices 90, a first liquid container 93, a first supply mechanism 94, a first heating section 97, a second liquid container 95, a second supply mechanism 96, and a second heating section 98. The control device 90 is, for example, a microcomputer that includes a microprocessor such as a CPU or an FPGA and a storage circuit such as semiconductor memory. The control device 90 controls operation of the respective sections of the liquid ejecting apparatus 100 by executing a program stored in advance in the storage circuit.

Liquid is stored in each of the first liquid container 93 and the second liquid container 95. A liquid stored in the first liquid container 93 is also called a first liquid, and a liquid stored in the second liquid container 95 is also called a second liquid. In the present embodiment, the first liquid in the first liquid container 93 and the second liquid in the second liquid container 95 have different components. Specifically, ink in which a pigment as a coloring material is dispersed in a solvent is stored in the first liquid container 93. In addition to ink in which a pigment is dispersed in a solvent, ink containing a dye or ink containing both a pigment and a dye as a coloring material may be used as the first liquid. Examples of the ink include various liquid compositions such as typical water-based ink, oil-based ink, gel ink, and hot-melt ink.

A reaction liquid as the second liquid is stored in the second liquid container 95. The reaction liquid contains a reactive component that reacts with the pigment in the ink, which is stored in the first liquid container 93, to aggregate or gel the pigment. The reactive component is, for example, a component that, when the reaction liquid is mixed with ink having a pigment, reacts with the coloring material contained in the ink and destroys stable dispersion of the ink. The reaction liquid is used, for example, to suppress blurring of the ink, which is also called bleeding. From the viewpoint of suppressing reaction of the ink with the reaction liquid from excessively proceeding before ejection, a time period from when the ink is mixed with the reaction liquid to when a mixed liquid is ejected is desirably short, and mixing is more desirably performed immediately before the ejection. Note that the first liquid and the second liquid may have the same component and may be the same liquid. The second liquid may be ink, and the first liquid may be a reaction liquid.

As the first liquid container 93 and the second liquid container 95, for example, a cartridge detachably attached to the liquid ejecting apparatus 100, a bag-like ink pack formed from a flexible film, an ink tank that is able to be replenished with ink, and the like may be adopted. In the present embodiment, information about viscosity of the liquid stored in the first liquid container 93 and the second liquid container 95 is input to the control device 90. Examples of a method of inputting information about viscosity of liquid to the control device 90 include a method of the control device 90 identifying information about viscosity stored in advance on a chip (not illustrated) or the like provided in each of the first liquid container 93 and the second liquid container 95, a method of a user of the liquid ejecting apparatus 100 manually inputting information about viscosity to the control device 90, and a method of outputting the result of measuring viscosity by using a viscometer to the control device 90.

The first supply mechanism 94 is a pump for supplying the first liquid stored in the first liquid container 93 to the liquid ejecting head 1. The second supply mechanism 96 is a pump for supplying the second liquid stored in the second liquid container 95 to the liquid ejecting head 1.

The first heating section 97 is a heater for heating the first liquid stored in the first liquid container 93 in accordance with control performed by the control device 90. The second heating section 98 is a heater for heating the second liquid stored in the second liquid container 95 in accordance with control performed by the control device 90. In the present embodiment, the first heating section 97 and the second heating section 98 are able to respectively heat the first liquid and the second liquid up to about several tens of degrees Celsius. As described below, the first heating section 97 and the second heating section 98 may respectively heat the first liquid and the second liquid up to any temperature exceeding several tens of degrees Celsius, for example, a temperature exceeding 100° C. in accordance with target viscosity of the first liquid and target viscosity of the second liquid.

As illustrated in FIG. 1, the liquid ejecting apparatus 100 further includes a moving mechanism 91 and a transport mechanism 92. The moving mechanism 91 transports the medium PP in the +Y direction in accordance with control performed by the control device 90. The transport mechanism 92 includes an accommodating case 921 that accommodates the liquid ejecting head 1 and an endless belt 922 to which the accommodating case 921 is fixed. The transport mechanism 92 operates the endless belt 922, to which the accommodating case 921 is fixed, in accordance with control performed by the control device 90 and thereby enables the liquid ejecting head 1 to be reciprocated in the X-axis direction. A transport direction of the medium PP and a movement direction of the liquid ejecting head 1 are not limited to being orthogonal to each other and may intersect each other at any angle. The first liquid container 93 and the first supply mechanism 94 may be accommodated in the accommodating case 921 together with the liquid ejecting head 1.

As illustrated in FIG. 1, the control device 90 outputs, to the liquid ejecting head 1, a drive signal Com for driving the liquid ejecting head 1 and a control signal SI for controlling the liquid ejecting head 1. The liquid ejecting head 1 is driven with the drive signal Com in accordance with control with the control signal SI to eject the ink from some or all of a plurality of nozzles provided in the liquid ejecting head 1. In the present embodiment, a direction in which the ink is ejected corresponds to the +Z direction. In conjunction with transport of the medium PP by the moving mechanism 91 and reciprocation of the liquid ejecting head 1 by the transport mechanism 92, the liquid ejecting head 1 ejects the ink from the nozzles and causes the ink to be deposited on the surface of the medium PP. As a result, a desired image is formed on the surface of the medium PP. Note that the direction in which the ink is ejected is not limited to the +Z direction and may be any direction intersecting the X-Y plane.

Figure 2:
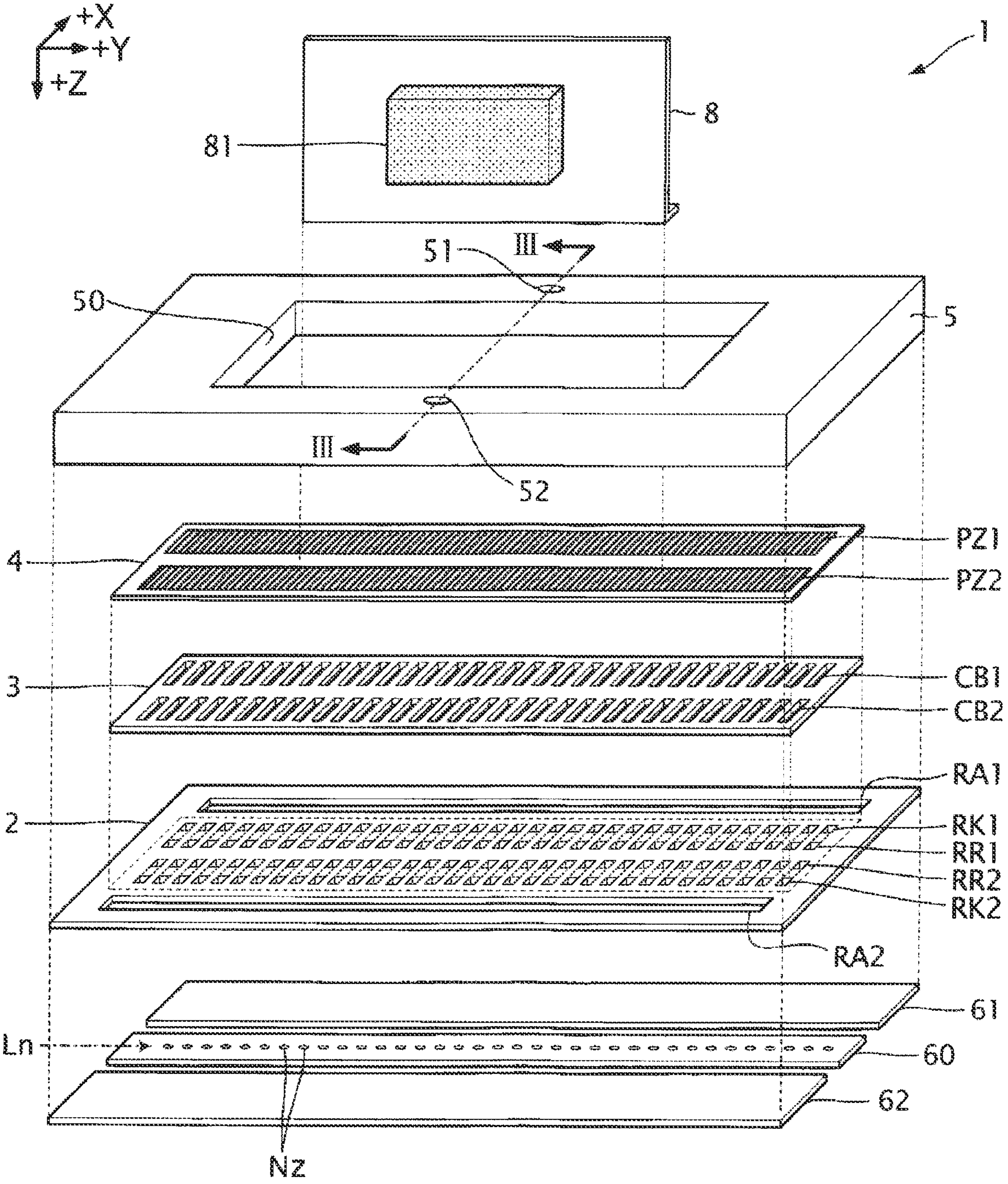
FIG. 2 is an exploded perspective view of a liquid ejecting head.
Figure 3:
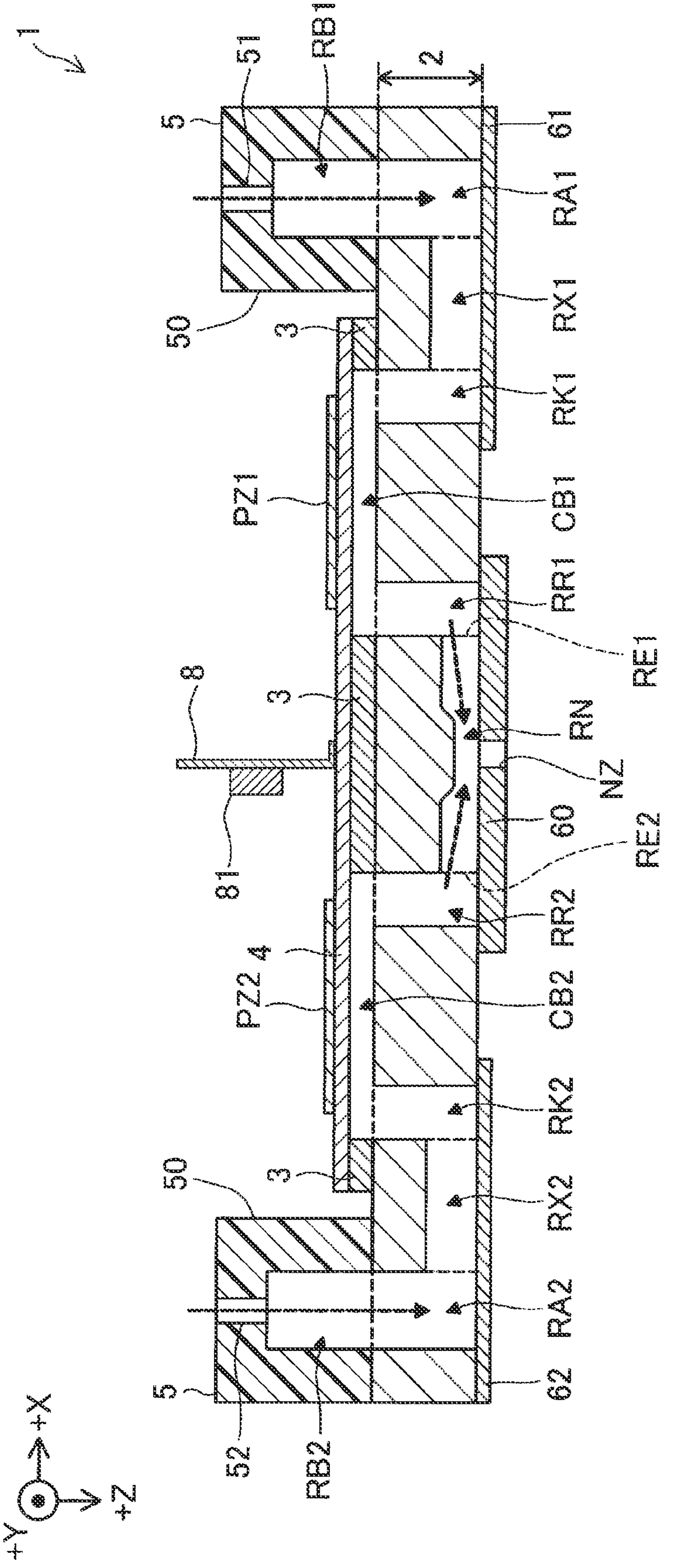
FIG. 3 is a sectional view along line III-III in FIG. 2.
Figure 4:
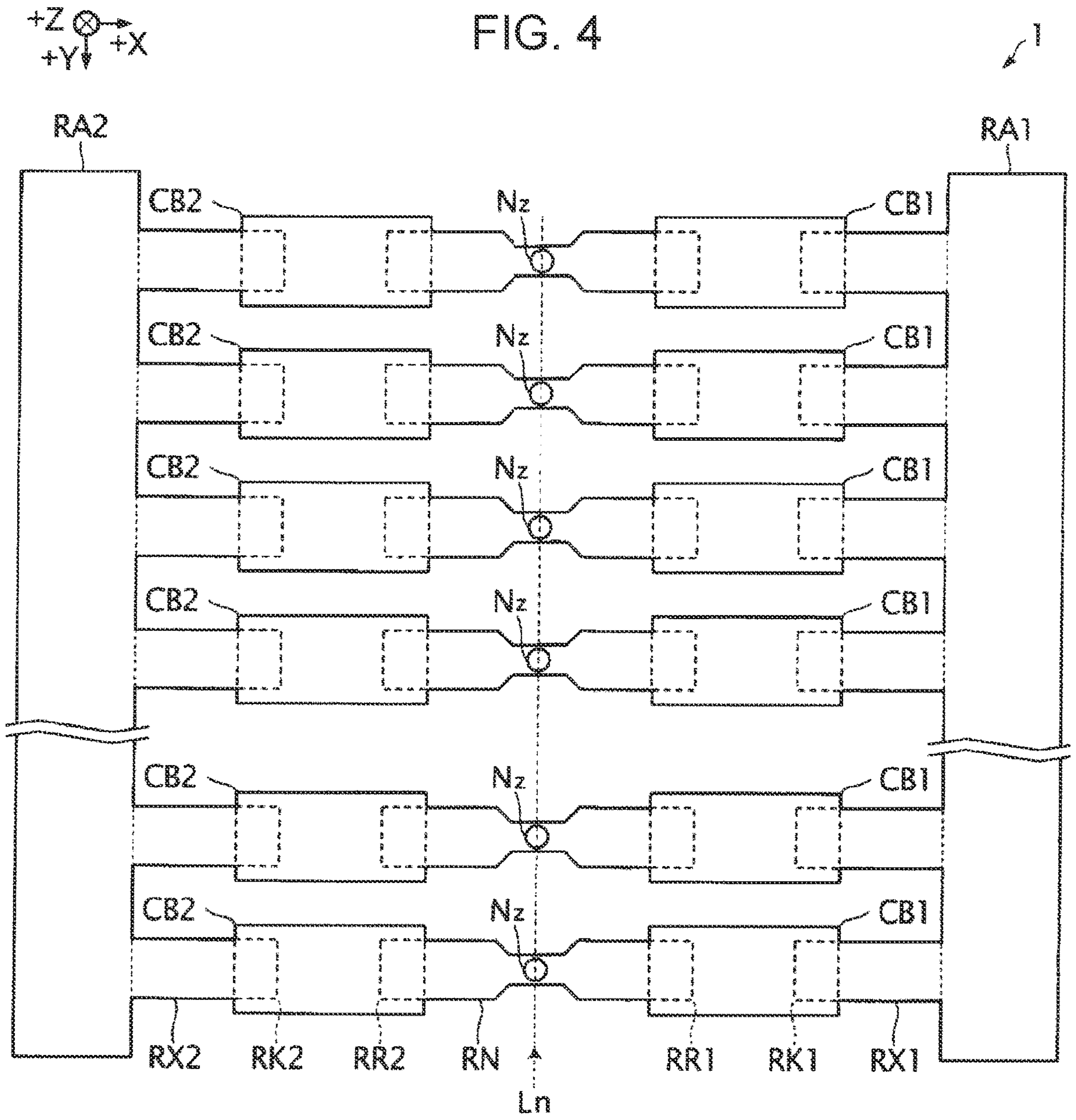
FIG. 4 is a plan view of the liquid ejecting head viewed from the −Z direction side.

A detailed configuration of the liquid ejecting head 1 will be described with reference to FIGS. 2 to 5. FIG. 2 is an exploded perspective view of the liquid ejecting head 1. FIG. 3 is a sectional view along line III-III in FIG. 2. FIG. 4 is a plan view of the liquid ejecting head 1 viewed from the −Z direction side. As illustrated in FIG. 2, the liquid ejecting head 1 includes a nozzle substrate 60, a communication plate 2, a pressure chamber substrate 3, a vibrating plate 4, an accumulation chamber forming substrate 5, a wiring substrate 8, a compliance sheet 61, and a compliance sheet 62.

As illustrated in FIG. 2, the nozzle substrate 60 is a plate member elongated in the Y-axis direction. The nozzle substrate 60 is disposed substantially parallel to the X-Y plane. The nozzle substrate 60 is manufactured, for example, in such a manner that a silicon monocrystalline substrate is processed by using a semiconductor manufacturing technique such as etching. M nozzles Nz are formed in the nozzle substrate 60, where M is a natural number of 1 or more. The nozzles Nz are through holes provided in the nozzle substrate 60. In the present embodiment, the M nozzles Nz are linearly arranged in the nozzle substrate 60 so as to form a nozzle row Ln that extends in the Y-axis direction.

As illustrated in FIG. 2, the communication plate 2 is provided on the surface of the nozzle substrate 60 in the −Z direction. The communication plate 2 is a plate member elongated in the Y-axis direction. The communication plate 2 is disposed substantially parallel to the X-Y plane. The communication plate 2 is manufactured, for example, in such a manner that a silicon monocrystalline substrate is processed by using a semiconductor manufacturing technique.

As illustrated in FIG. 2, an ink channel is formed in the communication plate 2. Specifically, a single first common supply channel RA1 elongated in a third direction, which corresponds to the Y-axis direction, and a single second common supply channel RA2 elongated in the third direction are formed in the communication plate 2.

As illustrated in FIGS. 2 and 3, M nozzle channels RN, M first communication channels RR1, M second communication channels RR2, M first individual supply channels RK1, M second individual supply channels RK2, M communication channels RX1, and M communication channels RX2, which correspond to the respective M nozzles Nz, are formed in the communication plate 2. As illustrated in FIG. 4, the first common supply channel RA1 and the second common supply channel RA2 are coupled by the M communication channels RX1, the M first individual supply channels RK1, M first pressure chambers CB1, the M first communication channels RR1, the M nozzle channels RN, the M second communication channels RR2, M second pressure chambers CB2, and the M communication channels RX2, which correspond to the respective M nozzles Nz.

As illustrated in FIG. 3, a communication channel RX1 is coupled to the first common supply channel RA1. The communication channel RX1 is elongated from the first common supply channel RA1 to the −X direction side in a first direction, which corresponds to the X-axis direction, so as to have an X-direction width wider than a Z-direction width. A first individual supply channel RK1 is coupled to the communication channel RX1. The communication channels RX1 may be, for example, elongated in the third direction so as to be formed as a single communication channel RX1 common to the M nozzles Nz. Note that, as illustrated in FIGS. 3 and 4, in the present embodiment, in a nozzle channel RN, a region in the vicinity of a nozzle Nz has a channel width wider than a region other than the region in the vicinity of the nozzle Nz in the +Z direction and the +Y direction. This makes it possible to increase the ink flow rate in the vicinity of the nozzle Nz, prevent, for example, the ink from continuously increasing in viscosity in the vicinity of the nozzle Nz, and suppress a reduction in ejection characteristics. However, the present embodiment is not limited to such a system, and, for example, the nozzle channel RN may be configured such that the region in the vicinity of the nozzle Nz and the region other than the region in the vicinity of the nozzle Nz have the same channel widths in both the +Z direction and the +Y direction.

The first individual supply channel RK1 is elongated from the communication channel RX1 to the −Z direction side in a second direction, which corresponds to the Z-axis direction. The first individual supply channel RK1 is coupled to one end of a first pressure chamber CB1 and enables the first common supply channel RA1 and the first pressure chamber CB1 to communicate with each other. The first individual supply channel RK1 supplies the first liquid from the first common supply channel RA1 to the first pressure chamber CB1. The first pressure chamber CB1 is elongated in the first direction, which corresponds to the X-axis direction. A first communication channel RR1 is coupled to the other end of the first pressure chamber CB1.

The first communication channel RR1 is elongated from the first pressure chamber CB1 to the +Z direction side in the second direction, which corresponds to the Z-axis direction. The first communication channel RR1 supplies the first liquid from the first pressure chamber CB1 to the nozzle channel RN.

The nozzle channel RN is elongated in the first direction, which corresponds to the X-axis direction. The nozzle channel RN includes a single nozzle Nz. The nozzle channel RN is disposed so as to be located between a first pressure chamber CB1 and a second pressure chamber CB2 in the X-axis direction. The first communication channel RR1 is coupled to one end RE1, which is an end portion of the nozzle channel RN in the +X direction. A second communication channel RR2 is coupled to the other end RE2, which is an end portion of the nozzle channel RN in the −X direction.

The second communication channel RR2 is elongated from the nozzle channel RN to the −Z direction side in the second direction, which corresponds to the Z-axis direction. The second communication channel RR2 is coupled to one end of the second pressure chamber CB2 and enables the nozzle channel RN and the second pressure chamber CB2 to communicate with each other. The second communication channel RR2 supplies the second liquid from the second pressure chamber CB2 to the nozzle channel RN. The second pressure chamber CB2 is elongated in the first direction, which corresponds to the X-axis direction. A second individual supply channel RK2 is coupled to the other end of the second pressure chamber CB2.

The second individual supply channel RK2 is elongated from the second pressure chamber CB2 to the +Z direction side in the second direction, which corresponds to the Z-axis direction. The second individual supply channel RK2 is coupled to one end of a communication channel RX2 and enables the second common supply channel RA2 and the second pressure chamber CB2 to communicate with each other. The second individual supply channel RK2 supplies the second liquid from the second common supply channel RA2 to the second pressure chamber CB2. The communication channel RX2 is elongated toward the −X direction side in the first direction, which corresponds to the X-axis direction, so as to have an X-direction width wider than a Z-direction width. The other end of the communication channel RX2 is coupled to the second common supply channel RA2. The communication channel RX2 may be, for example, elongated in the third direction so as to be formed as a single communication channel RX2 common to the M nozzles Nz.

As illustrated in FIGS. 2 and 3, the compliance sheet 61 is provided on the surface of the communication plate 2 in the +Z direction so as to block the first common supply channel RA1, the communication channel RX1, and the first individual supply channel RK1. The compliance sheet 61 is formed of, for example, an elastic material. The compliance sheet 61 absorbs a change in pressure of the ink in the first common supply channel RA1, the communication channel RX1, and the first individual supply channel RK1. The compliance sheet 62 is provided on the surface of the communication plate 2 in the +Z direction so as to block the second common supply channel RA2, the communication channel RX2, and the second individual supply channel RK2. The compliance sheet 62 is formed of, for example, an elastic material and absorbs a change in pressure of the ink in the second common supply channel RA2, the communication channel RX2, and the second individual supply channel RK2.

As illustrated in FIGS. 2 and 3, the accumulation chamber forming substrate 5 is provided on the surface of the communication plate 2 in the −Z direction. The accumulation chamber forming substrate 5 is a member elongated in the Y-axis direction. The accumulation chamber forming substrate 5 is formed, for example, by injection molding of a resin material. The accumulation chamber forming substrate 5 has an ink channel formed therein. Specifically, a single first introduction channel RB1 and a single second introduction channel RB2 are formed in the accumulation chamber forming substrate 5. As illustrated in FIG. 3, the first introduction channel RB1 is coupled to the first common supply channel RA1 of the communication plate 2, and the second introduction channel RB2 is coupled to the second common supply channel RA2 of the communication plate 2.

A first inlet 51 coupled to the first introduction channel RB1 and a second inlet 52 coupled to the second introduction channel RB2 are provided in the accumulation chamber forming substrate 5. The ink corresponding to the first liquid supplied from the first liquid container 93 flows into the first introduction channel RB1 via the first inlet 51. The reaction liquid corresponding to the second liquid supplied from the second liquid container 95 flows into the second introduction channel RB2 via the second inlet 52.

The ink supplied from the first liquid container 93 to the first inlet 51 flows into the first common supply channel RA1 via the first introduction channel RB1. Some ink flowing into the first common supply channel RA1 is distributed to a plurality of communication channels RX1 and a plurality of first individual supply channels RK1 and flows into a plurality of first pressure chambers CB1. Some ink flowing into the first pressure chamber CB1 flows into the nozzle channel RN via the first communication channel RR1.

The reaction liquid supplied from the second liquid container 95 to the second inlet 52 flows into the second common supply channel RA2 via the second introduction channel RB2. Some reaction liquid flowing into the second common supply channel RA2 is distributed to a plurality of communication channels RX2 and a plurality of second individual supply channels RK2 and flows into a plurality of second pressure chambers CB2. Some reaction liquid flowing into the second pressure chamber CB2 flows into the nozzle channel RN via the second communication channel RR2. The ink and the reaction liquid merge and are mixed in the nozzle channel RN, and a mixed liquid is generated in the nozzle channel RN.

As illustrated in FIGS. 2 and 3, an opening 50 is provided in the accumulation chamber forming substrate 5. The pressure chamber substrate 3, the vibrating plate 4, and the wiring substrate 8 are provided inside the opening 50. The pressure chamber substrate 3 is a plate member elongated in the Y-axis direction. The pressure chamber substrate 3 is provided on the surface of the communication plate 2 in the −Z direction. The pressure chamber substrate 3 is disposed substantially parallel to the X-Y plane. The pressure chamber substrate 3 is manufactured, for example, in such a manner that a silicon monocrystalline substrate is processed by using a semiconductor manufacturing technique. The M first pressure chambers CB1 and the M second pressure chambers CB2, which correspond to the respective M nozzles Nz, are formed in the pressure chamber substrate 3.

The first pressure chamber CB1 is elongated in the X-axis direction. The first pressure chamber CB1 enables the first individual supply channel RK1 and the first communication channel RR1 to communicate with each other. The second pressure chamber CB2 is elongated in the X-axis direction. The second pressure chamber CB2 enables the second individual supply channel RK2 and the second communication channel RR2 to communicate with each other. In the following description, when no distinction is made between the first pressure chamber CB1 and the second pressure chamber CB2, they are also called pressure chambers CBq.

The vibrating plate 4 is a plate member elongated in the Y-axis direction. As illustrated in FIGS. 2 and 3, the vibrating plate 4 is provided on the surface of the pressure chamber substrate 3 in the −Z direction. The vibrating plate 4 is a member capable of elastically vibrating and applies pressure to liquid in a pressure chamber CBq. The vibrating plate 4 is disposed substantially parallel to the X-Y plane. M first piezoelectric elements PZ1 corresponding to the respective M first pressure chambers CB1 and M second piezoelectric elements PZ2 corresponding to the respective M second pressure chambers CB2 are provided on the −Z direction side of the vibrating plate 4. In the following description, when no distinction is made between a first piezoelectric element PZ1 and a second piezoelectric element PZ2, they are also called piezoelectric elements PZq. A piezoelectric element PZq is an energy-converting element that converts electrical energy of the drive signal Com into kinetic energy. In the present embodiment, the piezoelectric element PZq is a drive element that deforms in accordance with a change in potential of the drive signal Com.

The wiring substrate 8 is mounted on the surface of the vibrating plate 4 in the −Z direction. The wiring substrate 8 is a component for electrically coupling the control device 90 and the liquid ejecting head 1. As the wiring substrate 8, for example, a flexible wiring substrate such as an FPC or an FFC is used. A drive circuit 81 is mounted on the wiring substrate 8. The drive circuit 81 switches between supplying and not supplying the drive signal Com to the piezoelectric element PZq in accordance with the control signal SI. In the present embodiment, the drive circuit 81 is able to output different drive signals Com to the first piezoelectric element PZ1 and the second piezoelectric element PZ2. The liquid ejecting head 1 may include two drive circuits 81 corresponding to the first piezoelectric element PZ1 and the second piezoelectric element PZ2 and two wiring substrates 8 corresponding to the first piezoelectric element PZ1 and the second piezoelectric element PZ2 to output different drive signals Com to the first piezoelectric element PZ1 and the second piezoelectric element PZ2.

Figure 5:
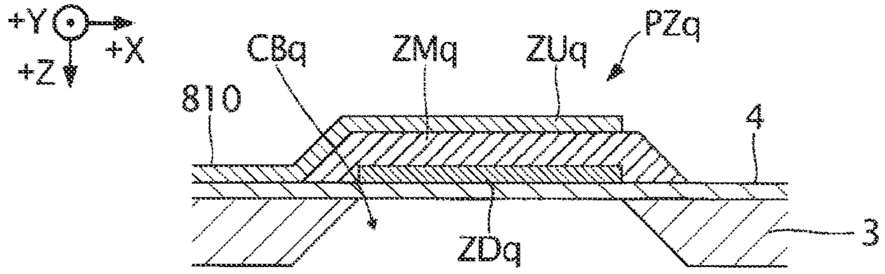
FIG. 5 is an enlarged sectional view of the vicinity of a piezoelectric element.

FIG. 5 is an enlarged sectional view of the vicinity of the piezoelectric element PZq. As illustrated in FIG. 5, the piezoelectric element PZq is a layered structure in which a piezoelectric material ZMq is interposed between a lower electrode ZDq and an upper electrode ZUq. A pressure chamber CBq is provided on the +Z direction side of the piezoelectric element PZq. A given reference potential is supplied to the lower electrode ZDq. The drive circuit 81 supplies the drive signal Com to the upper electrode ZUq via a wire 810. The drive signal Com supplied to the first piezoelectric element PZ1 is also called a drive signal Com1, and the drive signal Com supplied to the second piezoelectric element PZ2 is also called a drive signal Com2. In the present embodiment, the control device 90 is able to individually change a waveform of the drive signal Com1 supplied to the first piezoelectric element PZ1 and a waveform of the drive signal Com2 supplied to the second piezoelectric element PZ2.

When the piezoelectric element PZq deforms in accordance with a change in potential of the drive signal Com, the vibrating plate 4 vibrates with deformation of the piezoelectric element PZq. When the vibrating plate 4 vibrates, the pressure in the pressure chamber CBq changes. The change in pressure in the pressure chamber CBq causes the ink filled in the pressure chamber CBq to be ejected from the nozzle Nz via the nozzle channel RN. The liquid ejecting apparatus 100 of the present embodiment ejects, from a single nozzle Nz, the first liquid filled in the first pressure chamber CB1 and the second liquid filled in the second pressure chamber CB2. Specifically, when the first piezoelectric element PZ1 is driven with the drive signal Com1, some ink filled in the first pressure chamber CB1 flows in the first communication channel RR1 and the nozzle channel RN and is ejected from the nozzle Nz as a liquid mixed with the second liquid. When the second piezoelectric element PZ2 is driven with the drive signal Com2, some reaction liquid filled in the second pressure chamber CB2 flows in the second communication channel RR2 and the nozzle channel RN and is ejected from the nozzle Nz as a liquid mixed with the first liquid.

Figure 6:
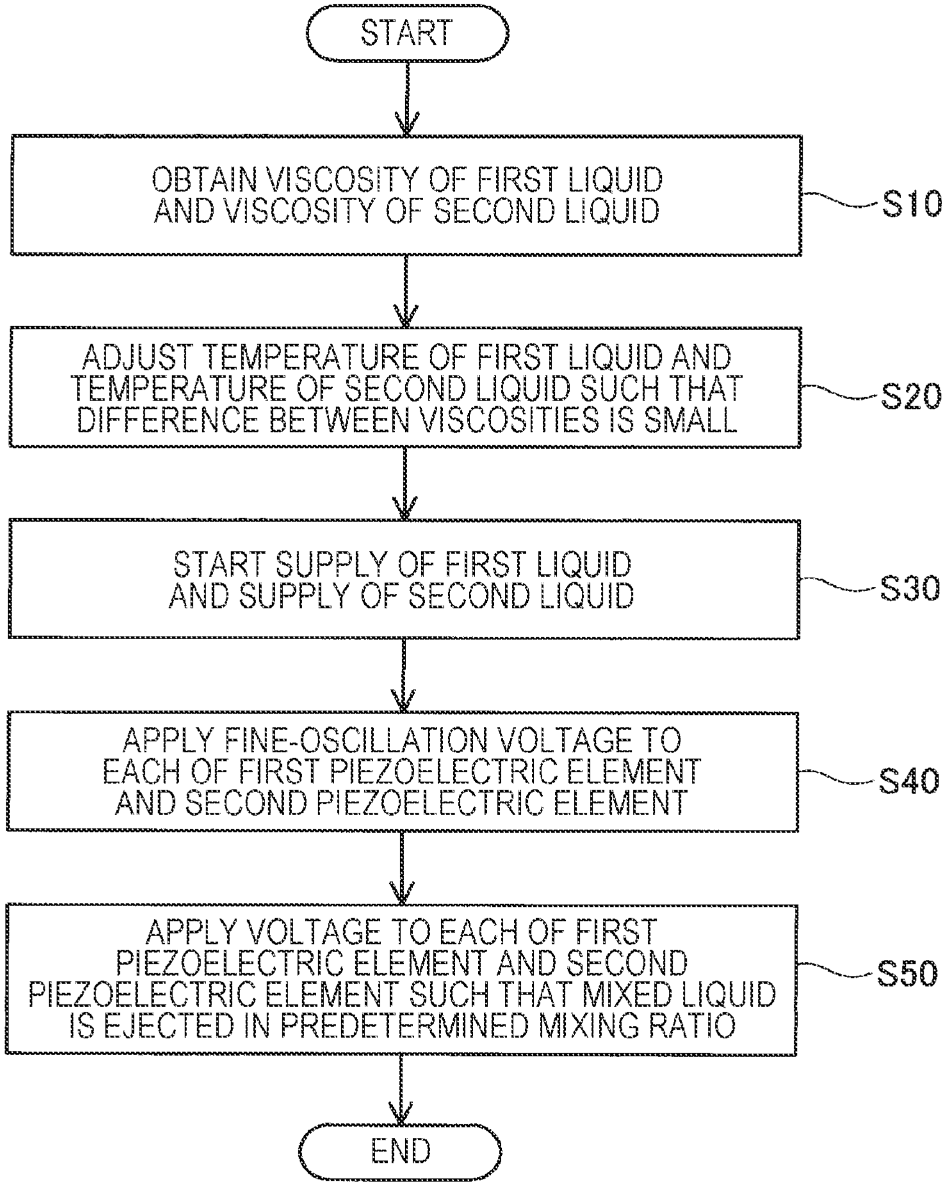
FIG. 6 is a flowchart of liquid ejection control performed by the liquid ejecting apparatus of the first embodiment.

FIG. 6 is a flowchart of liquid ejection control performed by the liquid ejecting apparatus 100 of the present embodiment. The present flow starts, for example, when the control device 90 identifies switching on of a start switch for starting printing.

In step S10, the control device 90 obtains information about viscosity of the first liquid and viscosity of the second liquid. In the present embodiment, the control device 90 reads the chip provided in each of the first liquid container 93 and the second liquid container 95 to thereby obtain the viscosity of the first liquid and the viscosity of the second liquid. Moreover, the control device 90 may include a mechanism for measuring viscosity or an average value of particle diameters of the ink in the liquid ejecting apparatus 100. In addition, the liquid ejecting apparatus 100 may include an input section and a display, and when a user performs an input to the input section in accordance with display on the display, the control device 90 may obtain viscosity or an average value of particle diameters of the ink. Step S10 may be performed, for example, only when the first liquid container 93 or the second liquid container 95 is replaced with a new one.

In step S20, the control device 90 adjusts temperature of the first liquid and temperature of the second liquid such that a difference between the viscosity of the first liquid and the viscosity of the second liquid is small, that is, the viscosity of the first liquid and the viscosity of the second liquid are equal to each other. In the present embodiment, target viscosity, which is a target value of the viscosity of the first liquid, and target viscosity, which is a target value of the viscosity of the second liquid, are set in advance. In the present embodiment, the target viscosity is set as viscosity, which is suitable for ejection of the liquid ejecting head 1 and suitable for mixing of the first liquid and the second liquid, and is set to, for example, 10 mPa·s. The target viscosity is set to any value obtained by considering improvement of ejection characteristics of a mixed liquid of the first liquid and the second liquid in the liquid ejecting head 1 and facilitation of mixing of the first liquid and the second liquid or, additionally, may be set as appropriate by considering a liquid type of the first liquid and the second liquid, a channel structure of the liquid ejecting head 1, a flow amount, and the like.

The control device 90 controls the first heating section 97 to adjust the temperature of the first liquid such that the first liquid has the target viscosity and controls the second heating section 98 to adjust the temperature of the second liquid such that the second liquid has the target viscosity. Each of the target temperature of the first liquid and the target temperature of the second liquid for achieving the target viscosity is stored in advance in memory of the control device 90. The control device 90 controls each of the first heating section 97 and the second heating section 98 to achieve target temperature corresponding to a liquid type. The target temperature may be obtained by using a map indicating a corresponding relationship between viscosity and temperature for each liquid type or obtained by performing calculation for each liquid type.

In step S30, the control device 90 supplies the first liquid and the second liquid to the liquid ejecting head 1. Specifically, the control device 90 controls the first supply mechanism 94 to supply the first liquid to the first introduction channel RB1 of the liquid ejecting head 1 and controls the second supply mechanism 96 to supply the second liquid to the second introduction channel RB2. As a result, the first liquid and the second liquid are supplied to the nozzle channel RN while having substantially equal viscosity and merge in the nozzle channel RN.

In step S40, the control device 90 applies a fine-oscillation voltage to each of the first piezoelectric element PZ1 and the second piezoelectric element PZ2. The fine-oscillation voltage indicates a drive voltage lower than a drive voltage for ejecting liquid from the nozzle Nz. The fine-oscillation voltage indicates a drive pulse that is included in the drive signal Com and that has a voltage difference smaller than a voltage difference between a minimum value and a maximum value of the voltage of a pulse signal for ejecting liquid. In the present embodiment, the control device 90 outputs the fine-oscillation voltage of the same waveform to the first piezoelectric element PZ1 and the second piezoelectric element PZ2. The control device 90 may individually output different fine-oscillation voltages to the first piezoelectric element PZ1 and the second piezoelectric element PZ2.

When the fine-oscillation voltage is input to the liquid ejecting head 1, the first piezoelectric element PZ1 and the second piezoelectric element PZ2 deform in accordance with a change in potential of the fine-oscillation voltage and change the pressure in the first pressure chamber CB1 and the pressure in the second pressure chamber CB2 through vibration of the vibrating plate 4. Since the fine-oscillation voltage is lower than the drive voltage for ejecting the ink, a pressure change in each of the first pressure chamber CB1 and the second pressure chamber CB2 is smaller than a pressure change in each of the first pressure chamber CB1 and the second pressure chamber CB2 during ejection. Thus, the first liquid filled in the first pressure chamber CB1 flows toward the nozzle channel RN but is not ejected from the nozzle Nz. Similarly, the second liquid filled in the second pressure chamber CB2 flows toward the nozzle channel RN but is not ejected from the nozzle Nz. As a result, the first liquid from the first pressure chamber CB1 and the second liquid from the second pressure chamber CB2 merge in the nozzle channel RN and are stirred in accordance with the applied pressure. By applying the fine-oscillation voltage, the liquid ejecting apparatus 100 of the present embodiment is able to facilitate stirring of the first liquid and the second liquid in the nozzle channel RN just above the nozzle Nz, that is, at a position corresponding to a timing immediately before ejection is performed.

In step S50, the control device 90 applies an ejection voltage to each of the first piezoelectric element PZ1 and the second piezoelectric element PZ2 and causes the nozzle Nz to eject a mixed liquid. The ejection voltage indicates a drive voltage applied to the piezoelectric element PZq to eject the liquid from the nozzle. In the present embodiment, the control device 90 individually adjusts the drive voltage applied to the first piezoelectric element PZ1 and the drive voltage applied to the second piezoelectric element PZ2 such that a mixing ratio of the first liquid and the second liquid in liquid droplets in a state of being ejected from the nozzle Nz is a predetermined mixing ratio.

The predetermined mixing ratio of the first liquid and the second liquid in the mixed liquid is set by using a mixing ratio suitable for performance of the mixed liquid. The mixing ratio suitable for performance of the mixed liquid is able to be determined in accordance with experiment data regarding the mixing ratio of the first liquid and the second liquid in the mixed liquid that has been ejected, for example, with respect to the drive voltages applied to the first piezoelectric element PZ1 and the second piezoelectric element PZ2. When a ratio of the first liquid is larger than a ratio of the second liquid, the control device 90 applies, to the first piezoelectric element PZ1, a drive voltage larger than the drive voltage applied to the second piezoelectric element PZ2. The pressure change caused in the first piezoelectric element PZ1 is larger than the pressure change caused in the second piezoelectric element PZ2. Thus, the flow amount of the first liquid is larger than the flow amount of the second liquid. As a result, the mixed liquid in which the ratio of the first liquid is large is ejected from the nozzle Nz. When the ratio of the second liquid is larger than the ratio the first liquid, the control device 90 applies, to the second piezoelectric element PZ2, a drive voltage larger than the drive voltage applied to the first piezoelectric element PZ1. As a result, the mixed liquid in which the ratio of the second liquid is large is ejected from the nozzle Nz. When ejection of the mixed liquid is completed, the control device 90 ends the present flow.

As described above, the liquid ejecting head 1 of the present embodiment includes: the nozzle channel RN in which the first liquid supplied from the first pressure chamber CB1 and the second liquid supplied from the second pressure chamber CB2 are mixed; and the nozzle Nz that is provided in the nozzle channel RN and ejects a mixture of the first liquid and the second liquid. The liquid ejecting head 1 of the present embodiment is able to mix the first liquid and the second liquid in the nozzle channel RN just above the nozzle Nz, that is, at a position corresponding to a timing immediately before ejection is performed. By mixing the first liquid and the second liquid at an appropriate timing at which reaction of the first liquid and the second liquid is suppressed or prevented from excessively proceeding before ejection, it is possible to suppress or prevent a reduction in liquid performance. Since the liquid ejecting head 1 of the present embodiment is able to eject the first liquid and the second liquid in a state of a mixed liquid, it is possible to reduce the number of times of ejection and improve productivity compared with an instance in which a plurality of liquids are mixed on a recording target medium.

According to the liquid ejecting apparatus 100 of the present embodiment, the control device 90 individually adjusts the drive voltage applied to the first piezoelectric element PZ1 and the drive voltage applied to the second piezoelectric element PZ2 such that the mixing ratio of the first liquid and the second liquid in liquid droplets ejected from the nozzle Nz is a predetermined mixing ratio. The liquid ejecting apparatus 100 of the present embodiment is able to adjust the mixing ratio of the first liquid and the second liquid by a simple method utilizing the first piezoelectric element PZ1 and the second piezoelectric element PZ2.

According to the liquid ejecting apparatus 100 of the present embodiment, when the ratio of the first liquid is larger than the ratio of the second liquid, the control device 90 applies, to the first piezoelectric element PZ1, a drive voltage larger than the drive voltage applied to the second piezoelectric element PZ2. When the ratio of the second liquid is larger than the ratio of the first liquid, the control device 90 applies, to the second piezoelectric element PZ2, a drive voltage larger than the drive voltage applied to the first piezoelectric element PZ1. The liquid ejecting apparatus 100 of the present embodiment is able to adjust the mixing ratio of the first liquid and the second liquid to any mixing ratio by a simple method utilizing the first piezoelectric element PZ1 and the second piezoelectric element PZ2.

According to the liquid ejecting apparatus 100 of the present embodiment, the control device 90 applies the fine-oscillation voltage, which is lower than the ejection voltage, to each of the first piezoelectric element PZ1 and the second piezoelectric element PZ2 before the ejection voltage is applied. The liquid ejecting apparatus 100 of the present embodiment is able to facilitate stirring of the first liquid and the second liquid by a simple method utilizing the first piezoelectric element PZ1 and the second piezoelectric element PZ2.

According to the liquid ejecting apparatus 100 of the present embodiment, the control device 90 controls the first heating section 97 and the second heating section 98 to heat the first liquid and the second liquid such that a difference between the viscosity of the first liquid and the viscosity of the second liquid is small. Even when the first liquid and the second liquid have different viscosities, by setting the viscosities to be equal to each other, it is possible to facilitate stirring of the first liquid and the second liquid.

B. Second Embodiment

Figure 7:
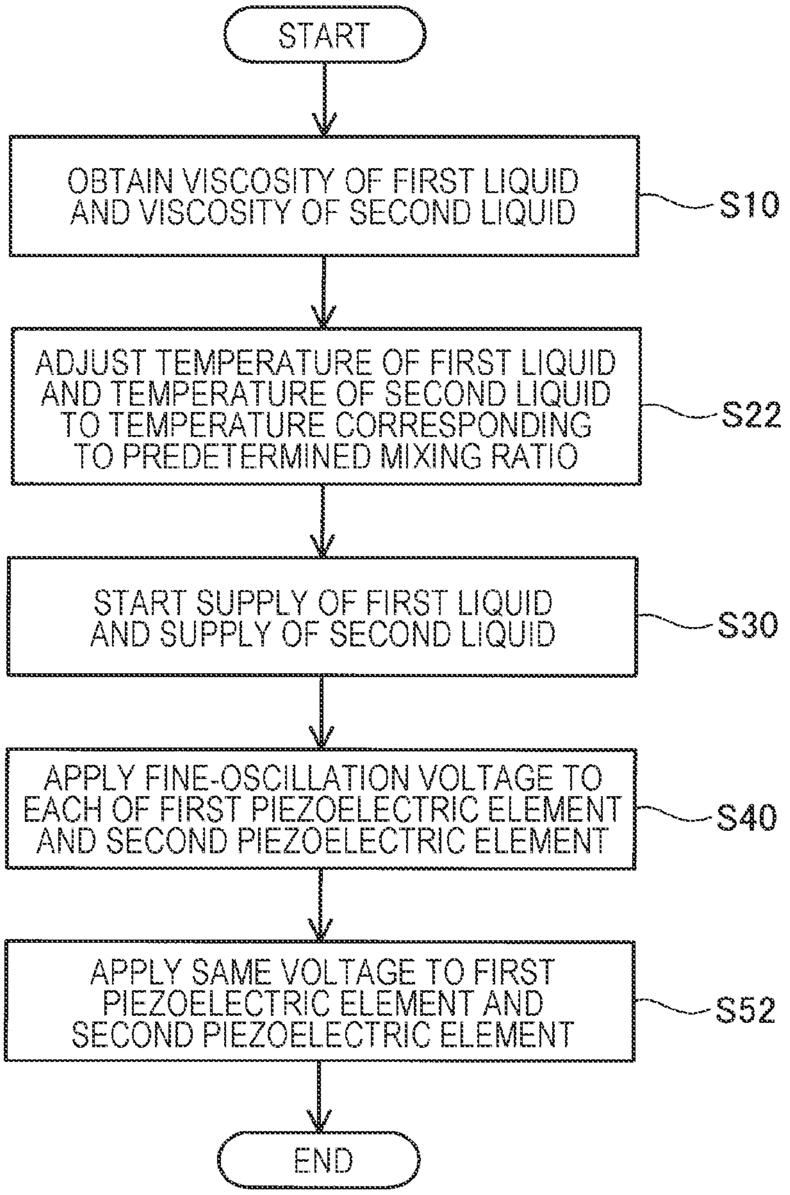
FIG. 7 is a flowchart of liquid ejection control performed by a liquid ejecting apparatus of a second embodiment.

FIG. 7 is a flowchart of liquid ejection control performed by a liquid ejecting apparatus 100 in a second embodiment of the disclosure. In the liquid ejecting apparatus 100 of the present embodiment, voltages supplied to the respective piezoelectric elements PZ1 and PZ2 are equal, and the waveform of the drive signal Com1 supplied to the first piezoelectric element PZ1 and the waveform of the drive signal Com2 supplied to the second piezoelectric element PZ2 are the same. The liquid ejecting apparatus 100 of the present embodiment adjusts the mixing ratio of the first liquid and the second liquid by using liquid viscosity. As illustrated in FIG. 7, liquid ejection control of the second embodiment includes step S22 instead of step S20 and includes step S52 instead of step S50. The liquid ejecting apparatus 100 of the second embodiment differs from the liquid ejecting apparatus 100 of the first embodiment in the above points, and the other configuration of the liquid ejecting apparatus 100 of the second embodiment is similar to the configuration of the liquid ejecting apparatus 100 of the first embodiment.

In step S10, similarly to the first embodiment, the control device 90 obtains information about viscosity of the first liquid and viscosity of the second liquid. In step S22, the control device 90 adjusts temperature of the first liquid and temperature of the second liquid to temperature corresponding to a predetermined mixing ratio. The temperature corresponding to the predetermined mixing ratio is temperature at which, when the same ejection voltage is applied to each of the piezoelectric elements PZ1 and PZ2 to eject a mixed liquid, each of the viscosity of the first liquid and the viscosity of the second liquid is adjusted to the viscosity required to achieve the predetermined mixing ratio of the first liquid and the second liquid in the mixed liquid. Typically, when viscosity of liquid is low, the flow amount of the liquid increases, and the amount of the liquid ejected from the nozzle Nz increases. In the liquid ejecting apparatus 100 of the present embodiment, setting is performed such that the viscosity of liquid, a ratio of which is set to be large, is lower than the viscosity of a liquid, a ratio of which is set to be small. Accordingly, in the mixed liquid ejected from the nozzle Nz, the ratio of the liquid that is set to have low viscosity is considered to be larger than the ratio of the liquid that is set to have high viscosity.

In the present embodiment, target viscosity of the first liquid and target viscosity of the second liquid for achieving the predetermined mixing ratio are set in advance, and target temperature of the first liquid for adjusting the viscosity of the first liquid to the target viscosity and target temperature of the second liquid for adjusting the viscosity of the second liquid to the target viscosity are set in advance. The control device 90 controls the first heating section 97 to adjust the temperature of the first liquid to the target temperature and controls the second heating section 98 to adjust the temperature of the second liquid to the target temperature.

In step S30, the control device 90 controls the first supply mechanism 94 and the second supply mechanism 96 to supply the first liquid and the second liquid to the liquid ejecting head 1. The first liquid and the second liquid merge in the nozzle channel RN in a state in which each of the viscosities is adjusted to the target viscosity. In step S40, similarly to the first embodiment, the control device 90 applies the fine-oscillation voltage to each of the first piezoelectric element PZ1 and the second piezoelectric element PZ2 to facilitate stirring of the first liquid and the second liquid in the nozzle channel RN. In step S52, the same ejection voltage is applied to the first piezoelectric element PZ1 and the second piezoelectric element PZ2. As a result, the mixed liquid in which the mixing ratio of the first liquid and the second liquid is adjusted to the predetermined mixing ratio by using a difference between the viscosities is ejected from the nozzle Nz. When ejection of the mixed liquid is completed, the control device 90 ends the present flow.

According to the liquid ejecting apparatus 100 of the present embodiment, when the ratio of the first liquid to the mixed liquid is larger than the ratio of the second liquid, the control device 90 controls the first heating section 97 so as to heat the first liquid, and when the ratio of the second liquid is larger than the ratio of the first liquid, the control device 90 controls the second heating section 98 so as to heat the second liquid. The liquid ejecting apparatus 100 of the present embodiment performs adjustment so as to increase the mixing ratio by heating the liquid, a ratio of which in the mixed liquid is to be increased, to reduce the viscosity. Accordingly, the first heating section 97 and the second heating section 98 are able to adjust the mixing ratio of the first liquid and the second liquid in the mixed liquid. Since the mixing ratio is able to be adjusted without adjusting the ejection voltage supplied to each of the piezoelectric elements PZ1 and PZ2, it is possible to simplify control performed by the control device 90.

C. Other Embodiments (C1) The embodiments described above indicate an example in which the first heating section 97 and the second heating section 98 are provided as heaters. On the other hand, a temperature adjusting section for performing heating and cooling may be provided instead of the first heating section 97 and the second heating section 98. The liquid ejecting apparatus 100 according to such an aspect is able to adjust the viscosity of the first liquid and the viscosity of the second liquid in a wider range.

(C2) In the first embodiment described above, the control device 90 controls operation of both the first heating section 97 and the second heating section 98 such that a difference between the viscosity of the first liquid and the viscosity of the second liquid is small. On the other hand, the control device 90 may control either the first heating section 97 or the second heating section 98 such that a difference between the viscosity of the first liquid and the viscosity of the second liquid is small. For example, when the second liquid has the target viscosity at a normal temperature, the first heating section 97 may adjust the temperature of only the first liquid to heat only the first liquid. The first embodiment described above indicates an example in which the liquid ejecting apparatus 100 includes both the first heating section 97 and the second heating section 98. On the other hand, the liquid ejecting apparatus 100 may include at least the first heating section 97 or the second heating section 98. Note that, when the first liquid and the second liquid are the same liquid, the first liquid and the second liquid may be adjusted to have the same target temperature by two heating sections, or temperature of both the first liquid and the second liquid may be adjusted by a single heating section.

(C3) In the embodiments described above, a single first pressure chamber CB1 that performs communication via a first communication channel RR1, a single first piezoelectric element PZ1 corresponding to the first pressure chamber CB1, a single second pressure chamber CB2 that performs communication via the second communication channel RR2, and a single second piezoelectric element PZ2 corresponding to the second pressure chamber CB2 are provided for a single nozzle Nz and a single nozzle channel RN. On the other hand, four pressure chambers CBq and four piezoelectric elements PZq corresponding to the respective pressure chambers CBq may be provided for a single nozzle Nz and a single nozzle channel RN. For example, two first pressure chambers CB1 that communicate with a single nozzle Nz and a single nozzle channel RN via two first communication channels RR1, two first piezoelectric elements PZ1 corresponding to the respective first pressure chambers CB1, two second pressure chambers CB2 that communicate with the nozzle channel RN via two communication channels RR2, and two second piezoelectric elements PZ2 corresponding to the respective second pressure chambers CB2 may be provided.

(C4) In the first embodiment described above, the liquid ejecting apparatus 100 controls the first heating section 97 and the second heating section 98 to heat the first liquid and the second liquid such that a difference between the viscosity of the first liquid and the viscosity of the second liquid is small, and further adjusts the mixing ratio of the first liquid and the second liquid by using the first piezoelectric element PZ1 and the second piezoelectric element PZ2. On the other hand, the liquid ejecting apparatus 100 may adjust the mixing ratio of the first liquid and the second liquid by using the first piezoelectric element PZ1 and the second piezoelectric element PZ2 without a heating section performing heating. Here, when the ratio of the first liquid is larger than the ratio of the second liquid, the control device 90 applies, to the first piezoelectric element PZ1, a drive voltage larger than the drive voltage applied to the second piezoelectric element PZ2. When the ratio of the second liquid is larger than the ratio of the first liquid, the control device 90 applies, to the second piezoelectric element PZ2, a drive voltage larger than the drive voltage applied to the first piezoelectric element PZ1. Even the liquid ejecting apparatus 100 according to such an aspect is able to adjust the mixing ratio of the first liquid and the second liquid to any mixing ratio by using the first piezoelectric element PZ1 and the second piezoelectric element PZ2.

(C5) The embodiments described above indicate an example in which the respective channels of the first common supply channel RA1, the second common supply channel RA2, the nozzle channel RN, the first communication channel RR1, the second communication channel RR2, the first individual supply channel RK1, the second individual supply channel RK2, the communication channel RX1, the communication channel RX2, the first pressure chamber CB1, and the second pressure chamber CB2 extend in directions which correspond to the X-axis direction, the Y-axis direction, and the Z-axis direction and which are orthogonal to each other. On the other hand, the respective channels are not limited to extending in directions orthogonal to each other but may extend in directions intersecting each other at any angle.

D. Other Aspects

The disclosure is not limited to the embodiments described above and may be implemented in various aspects without departing from the scope of the disclosure. For example, the disclosure can be implemented in the following aspects. To solve some or all of problems of the disclosure or to achieve some or all of effects of the disclosure, technical features in the embodiments described above corresponding to technical features in the aspects described below can be replaced or combined as appropriate. The technical features can be deleted as appropriate unless the technical features are described as essential in the present specification.

(1) According to an aspect of the disclosure, a liquid ejecting head is provided. The liquid ejecting head includes: a first pressure chamber to which a first liquid is supplied; a first drive element that applies pressure to the first liquid in the first pressure chamber; a second pressure chamber to which a second liquid is supplied; a second drive element that applies pressure to the second liquid in the second pressure chamber; a nozzle channel which has one end communicating with the first pressure chamber and another end communicating with the second pressure chamber and in which the first liquid supplied from the first pressure chamber and the second liquid supplied from the second pressure chamber are mixed; and a nozzle that is provided in the nozzle channel and ejects a mixture of the first liquid and the second liquid. The liquid ejecting head according to such an aspect is able to mix the first liquid and the second liquid in the nozzle channel including the nozzle, that is, at a position corresponding to a timing immediately before ejection is performed. Accordingly, by mixing the first liquid and the second liquid appropriately, it is possible to suppress or prevent a reduction in performance of a mixed liquid of the first liquid and the second liquid.

(2) In the liquid ejecting head according to the above aspect, the first pressure chamber may be elongated in a first direction, the second pressure chamber may be elongated in the first direction, and the nozzle channel may be elongated in the first direction and may be disposed between the first pressure chamber and the second pressure chamber.

(3) The liquid ejecting head according to the above aspect may further include: a first communication channel that couples the one end of the nozzle channel and the first pressure chamber and is elongated in a second direction, which intersects the first direction; and a second communication channel that couples the other end of the nozzle channel and the second pressure chamber and is elongated in the second direction.

(4) In the liquid ejecting head according to the above aspect, the first pressure chamber may include a plurality of first pressure chambers, and the second pressure chamber may include a plurality of second pressure chambers. The liquid ejecting head may further include: a plurality of first individual supply channels which supply the first liquid to the plurality of first pressure chambers and each of which communicates with corresponding one of the plurality of first pressure chambers; a first common supply channel that is common to the plurality of first individual supply channels and distributes the first liquid to the plurality of first individual supply channels; a plurality of second individual supply channels which supply the second liquid to the plurality of second pressure chambers and each of which communicates with corresponding one of the plurality of second pressure chambers; and a second common supply channel RA2 that is common to the plurality of second individual supply channels and distributes the second liquid to the plurality of second individual supply channels.

(5) In the liquid ejecting head according to the above aspect, the first individual supply channel may be elongated in the second direction, the first common supply channel may be elongated in a third direction, which intersects the first direction and the second direction, the second individual supply channel may be elongated in the second direction, and the second common supply channel may be elongated in the third direction.

(6) The liquid ejecting head according to the above aspect may further include: a pressure chamber substrate including the first pressure chamber and the second pressure chamber; a communication plate including the nozzle channel; and a nozzle substrate including the nozzle.

(7) According to another aspect of the disclosure, a liquid ejecting apparatus is provided. The liquid ejecting apparatus includes the liquid ejecting head according to the above aspect and a control device configured to control operation of the liquid ejecting head.

(8) In the liquid ejecting apparatus according to the above aspect, the control device may individually adjust a drive voltage applied to the first drive element and a drive voltage applied to the second drive element such that a mixing ratio of the first liquid and the second liquid in liquid droplets ejected from the nozzle is a predetermined mixing ratio. The liquid ejecting apparatus according to such an aspect is able to adjust the mixing ratio of the first liquid and the second liquid by a simple method utilizing the first drive element and the second drive element.

(9) In the liquid ejecting apparatus according to the above aspect, when a ratio of the first liquid is larger than a ratio of the second liquid in the predetermined mixing ratio, the control device may cause a drive voltage larger than a drive voltage applied to the second drive element to be applied to the first drive element and cause a mixture of the first liquid and the second liquid to be ejected, and when the ratio of the second liquid is larger than the ratio of the first liquid, the control device may cause a drive voltage larger than a drive voltage applied to the first drive element to be applied to the second drive element and cause a mixture of the first liquid and the second liquid to be ejected. The liquid ejecting apparatus according to such an aspect is able to adjust the mixing ratio of the first liquid and the second liquid to any mixing ratio by a simple method utilizing the first drive element and the second drive element.

(10) In the liquid ejecting apparatus according to the above aspect, before drive voltages for ejecting the first liquid and the second liquid are applied to the first drive element and the second drive element, the control device may cause a voltage lower than the drive voltages for ejecting the first liquid and the second liquid to be applied to the first drive element and the second drive element. The liquid ejecting apparatus according to such an aspect is able to facilitate stirring of the first liquid and the second liquid by a simple method utilizing the first drive element and the second drive element.

(11) The liquid ejecting apparatus according to the above aspect may further include a heating section that heats at least the first liquid or the second liquid. The control device may control the heating section to heat at least the first liquid or the second liquid such that a difference between viscosity of the first liquid and viscosity of the second liquid is small. Even when the first liquid and the second liquid have different viscosities, by setting the viscosities to be equal to each other, the liquid ejecting apparatus according to such an aspect is able to facilitate stirring of the first liquid and the second liquid.

(12) The liquid ejecting apparatus according to the above aspect may further include a heating section that heats at least the first liquid or the second liquid. When a ratio of the first liquid is larger than a ratio of the second liquid in a mixing ratio of the first liquid and the second liquid in liquid droplets ejected from the nozzle, the control device may control the heating section to heat the first liquid and the first liquid and the second liquid may be supplied to the liquid ejecting head, and when the ratio of the second liquid is larger than the ratio of the first liquid, the control device may control the heating section to heat the second liquid and the first liquid and the second liquid may be supplied to the liquid ejecting head. The liquid ejecting apparatus according to such an aspect is able to adjust the mixing ratio of the first liquid and the second liquid in a mixed liquid by using the heating section.

(13) In the liquid ejecting apparatus according to the above aspect, the first liquid may contain a coloring material, and the second liquid may contain a reactive component that reacts with the coloring material to aggregate or gel the coloring material. In the liquid ejecting apparatus according to the above aspect, by mixing the first liquid and the second liquid appropriately, it is possible to improve quality of an ink image.

The disclosure can also be realized in various aspects other than the liquid ejecting apparatus. For example, the disclosure can be realized in aspects such as a method of manufacturing the liquid ejecting apparatus, a method of controlling the liquid ejecting apparatus, a computer program realizing the control method, a non-transitory recording medium having the computer program recorded therein.

The disclosure is not limited to an ink jet apparatus and may be applied to any liquid ejecting apparatus that ejects liquid other than ink and a liquid ejecting head used in the liquid ejecting apparatus. For example, the disclosure may be applied to various liquid ejecting apparatuses as follows and liquid ejecting heads thereof:

(1) an image recording apparatus such as a facsimile machine,
(2) a coloring material ejecting apparatus used in manufacturing a color filter for an image display apparatus such as a liquid crystal display,
(3) an electrode material ejecting apparatus used to form electrodes of an organic EL (electroluminescence) display, a surface emitting display (field emission display or FED), and the like,
(4) a liquid ejecting apparatus that ejects liquid containing a bioorganic substance used in manufacturing biochips,
(5) a sample ejecting apparatus serving as a precision pipette,
(6) a lubricating oil ejecting apparatus,
(7) a liquid resin ejecting apparatus,
(8) a liquid ejecting apparatus that ejects lubricating oil in a pinpoint manner onto a precision instrument such as a clock or a camera,
(9) a liquid ejecting apparatus that ejects a transparent liquid resin such as an ultraviolet curing liquid resin on a substrate to form a hemispherical microlens (an optical lens) used in an optical communication element and the like,
(10) a liquid ejecting apparatus that ejects an acid or alkaline etchant to perform etching of a substrate and the like, and
(11) a liquid ejecting apparatus including a liquid consumption head that ejects any other minute liquid droplets.

The term "liquid droplets" refer to a state of liquid ejected from the liquid ejecting apparatus, and examples thereof include a granular shape, a tear shape, and a thread shape in a trailing shape. Further, the term "liquid" here refers to any material that is able to be consumed by the liquid ejecting apparatus. For example, "liquid" may be any material as long as it is a material in a state where a substance is a liquid phase, and examples thereof include a liquid state material having high or low viscosity and a liquid state material such as sol, gel water, other inorganic solvents, organic solvent, solution, liquid resin, and liquid metal (metal melt). Examples of the "liquid" further include, in addition to liquid as one state of a substance, materials in which particles of a functional material having solids such as pigments and metal particles are dissolved, dispersed, or mixed in a solvent. In addition, representative examples of a combination of the first liquid and the second liquid include combinations as follows in addition to a combination of ink and a reaction liquid as described in the embodiments described above:

(1) a principal ingredient of adhesive and a curing agent,
(2) base paint of paint and diluent or clear paint and diluent,
(3) a main solvent containing cells of cell ink and a diluent solvent,
(4) a metallic leaf pigment dispersion liquid of ink (metallic ink) that expresses metallic luster and a diluent solvent,
(5) fuel for vehicles, such as gasoline or light oil, and biofuel, (6) a main ingredient and a protective ingredient in medicine, and (7) a phosphor and a sealing material of a light-emitting diode (LED).

What is claimed is:

1. A liquid ejecting apparatus comprising:

a liquid ejected head, a control device configured to control operation of the liquid ejecting head; and a heating section that heats at least a first liquid, wherein the liquid ejected head comprises:

a first pressure chamber to which the first liquid is supplied;

a first drive element that applies pressure to the first liquid in the first pressure chamber;

a second pressure chamber to which a second liquid is supplied;

a second drive element that applies pressure to the second liquid in the second pressure chamber;

a nozzle channel which has one end communicating with the first pressure chamber and another end communicating with the second pressure chamber and in which the first liquid supplied from the first pressure chamber and the second liquid supplied from the second pressure chamber are mixed; and a nozzle that is provided in the nozzle channel and ejects a mixture of the first liquid and the second liquid, wherein when a ratio of the first liquid is larger than a ratio of the second liquid in a mixing ratio of the first liquid and the second liquid in liquid droplets ejected from the nozzle, the control device controls the heating section to heat the first liquid and the first liquid and the second liquid are supplied to the liquid ejecting head.

2. The liquid ejecting apparatus according to claim 1, wherein the control device individually adjusts a drive voltage applied to the first drive element and a drive voltage applied to the second drive element such that a mixing ratio of the first liquid and the second liquid in liquid droplets ejected from the nozzle is a predetermined mixing ratio.

3. The liquid ejecting apparatus according to claim 2, wherein when a ratio of the first liquid is larger than a ratio of the second liquid in the predetermined mixing ratio, the control device causes a drive voltage larger than a drive voltage applied to the second drive element to be applied to the first drive element and causes a mixture of the first liquid and the second liquid to be ejected, and when the ratio of the second liquid is larger than the ratio of the first liquid, the control device causes a drive voltage larger than a drive voltage applied to the first drive element to be applied to the second drive element and causes a mixture of the first liquid and the second liquid to be ejected.

4. The liquid ejecting apparatus according to claim 1, wherein before drive voltages for ejecting the first liquid and the second liquid are applied to the first drive element and the second drive element, the control device causes a voltage lower than the drive voltages for ejecting the first liquid and the second liquid to be applied to the first drive element and the second drive element.

5. The liquid ejecting apparatus according to claim 1, further comprising:

a heating section that heats at least the first liquid or the second liquid, wherein the control device controls the heating section to heat at least the first liquid or the second liquid such that a difference between viscosity of the first liquid and viscosity of the second liquid is small.

6. The liquid ejecting apparatus according to claim 1, wherein the heating section further heats the second liquid, and wherein when the ratio of the second liquid is larger than the ratio of the first liquid, the control device controls the heating section to heat the second liquid and the first liquid and the second liquid are supplied to the liquid ejecting head.

7. The liquid ejecting apparatus according to claim 1, wherein the first liquid contains a coloring material, and the second liquid contains a reactive component that reacts with the coloring material to aggregate or gel the coloring material.

8. A liquid ejecting method comprising:

preparing a first drive element that applies pressure to a first liquid and a second drive element that applies pressure to a second liquid;

supplying the first liquid and the second liquid to a nozzle channel including a nozzle;

causing, when a ratio of the first liquid is larger than a ratio of the second liquid in a mixing ratio of the first liquid and the second liquid in liquid droplets ejected from the nozzle, a drive voltage larger than a drive voltage applied to the second drive element to be applied to the first drive element and causing a mixture of the first liquid and the second liquid to be ejected from the nozzle;

causing, when the ratio of the second liquid is larger than the ratio of the first liquid in the mixing ratio, a drive voltage larger than a drive voltage applied to the first drive element to be applied to the second drive element and causing a mixture of the first liquid and the second liquid to be ejected from the nozzle;

causing, when the ratio of the first liquid is larger than a ratio of the second liquid in the mixing ratio of the first liquid and the second liquid in liquid droplets ejected from the nozzle, a heating section to heat the first liquid and the first liquid and the second liquid are supplied to a liquid ejecting head.

* * * * *